United States Patent [19]
Palalau et al.

[11] Patent Number: 6,115,008
[45] Date of Patent: *Sep. 5, 2000

[54] TRANSPARENT EL DISPLAY

[75] Inventors: Silviu Palalau, Birmingham; Marian O. Borzea, Farmington Hills; Daniel Toffolo, Dearborn; Robert M. Roza, Farmington Hills, all of Mich.

[73] Assignee: Lear Automotive Dearborn, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/023,139

[22] Filed: Feb. 12, 1998

[51] Int. Cl.[7] ........................................................ G09G 5/00
[52] U.S. Cl. .............................. 345/7; 340/461; 345/100
[58] Field of Search ..................... 345/7, 8, 9, 4, 345/6, 31, 100; 359/609, 113; 349/143

[56] References Cited

U.S. PATENT DOCUMENTS

| | | | |
|---|---|---|---|
| 4,837,551 | 6/1989 | Iino | 345/7 |
| 5,867,140 | 2/1999 | Rader | 345/98 |

*Primary Examiner*—Dennis-Doon Chow
*Assistant Examiner*—Fritz Alphonse
*Attorney, Agent, or Firm*—Niro, Scavone, Haller & Niro

[57] ABSTRACT

A transparent EL display screen has a frame or rim member along only one edge of the screen. The screen is mounted within a vehicle interior so that it can be put in a position above the instrument panel and within the normal line of sight of a driver. Since the display screen is transparent and does not include a frame or rim around its entire parameter, the display screen makes information available without obstructing the driver's view of the road. The single frame or rim member supports all of the row and column drivers that are used to selectively illuminate the pixels on the display screen.

15 Claims, 1 Drawing Sheet

TRANSPARENT EL DISPLAY

BACKGROUND OF THE INVENTION

This invention generally relates to a display system for use in a vehicle and, more particularly, to a display screen that has a rim along only one side where all power and data supplied to the screen comes from that one side.

A variety of display systems are available for use in vehicles. With the increasing number of electrical subsystems within a vehicle and the increasing number of features provided to a driver, it is necessary and useful to provide more information to a driver. Conventional instrument panels typically do not have sufficient room to display all of the information that could be useful to a driver. Moreover, with improvements in technology it is possible and desirable to provide a variety of information to a driver in a variety of formats. Conventional instrument panels are not capable of meeting this need.

A variety of display screens have been suggested for use in vehicles to provide additional types of information to the driver. A major drawback associated with each of the previously proposed systems is that it must be mounted in a position on the instrument panel or dashboard of the vehicle, where space is limited. Further, it is a challenge to provide a display panel in a position where it is easily observed by a driver without unnecessarily or undesirably distracting the driver from the task of watching the road.

This invention provides a display system having a uniquely designed display panel that enables a driver to have access to a variety of visible information. Further, this invention provides a display system that places the visible information within the typical or normal line of sight of a driver without obstructing the driver's view of the road.

SUMMARY OF THE INVENTION

In general terms, this invention is a display system for a vehicle having a transparent EL display screen that can be positioned above the dashboard and instrument panel within the normal line of sight of the driver. Because the display screen is transparent and only has a frame or rim along one edge of the screen, the display does not obstruct the driver's view of the road.

A display system designed according to this invention includes several basic components. A display panel has a first reconfigurable portion and a second portion. A panel rim extends along only one side of the panel. A plurality of row electrodes are supported by the panel rim and extend from the rim into the second panel portion at an angle relative to the one side of the panel. The row electrodes also extend through the reconfigurable first portion of the panel in a direction that preferably is generally parallel to the one side of the panel. A plurality of column electrodes also are supported by the panel rim. The column drivers extend from the rim into the first panel portion in a direction that is generally perpendicular to the one side of the panel such that the column electrodes interact with the row electrodes extending through the first panel portion. The column drivers and row drivers are used to control the illumination of pixels within the first portion of the display panel.

Various features and advantages of this invention will become apparent to those skilled in the art from the following detailed description of the presently preferred embodiment. The drawings that accompanying the detailed description can be briefly described as follows.

DETAILED DESCRIPTION OF THE PREFERRED EMBODIMENT

Figure 1:
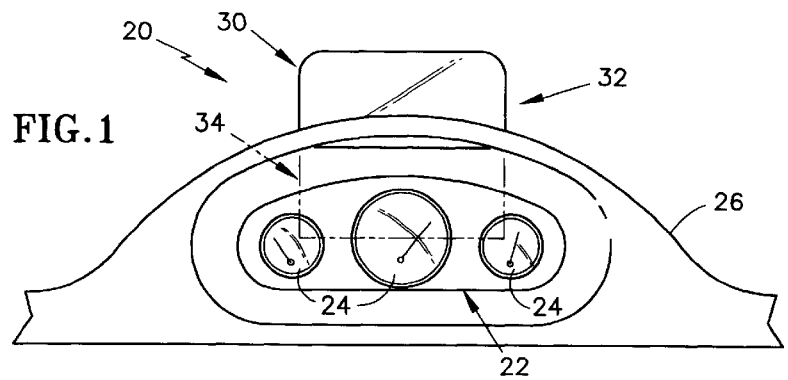
FIG. 1 is a schematic, diagrammatic illustration of a display system designed according to this invention.

FIG. 1 diagrammatically and schematically shows a display system 20 for use in a vehicle. The display system 20 includes an instrument panel 22 that includes a plurality of gauges 24, such as a speedometer, tachometer and fuel gauge, for example. The instrument panel 22 is supported on a dashboard or instrument panel frame 26 in a conventional manner.

Figure 2:
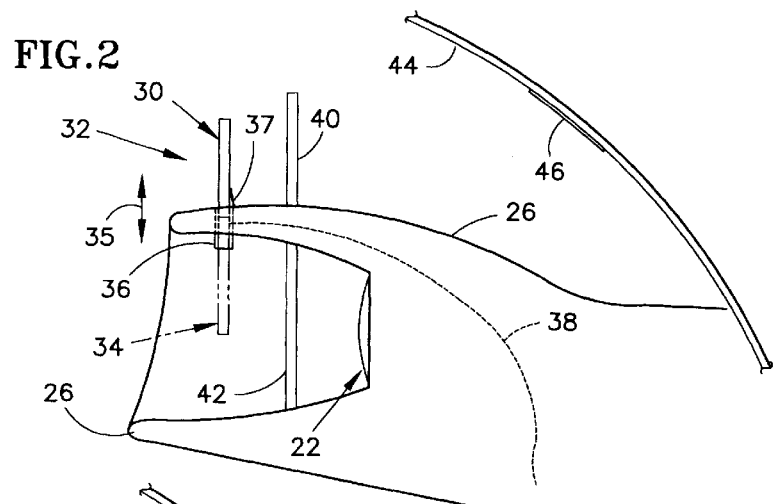
FIG. 2 is a side view of a first embodiment of this invention.
Figure 3:
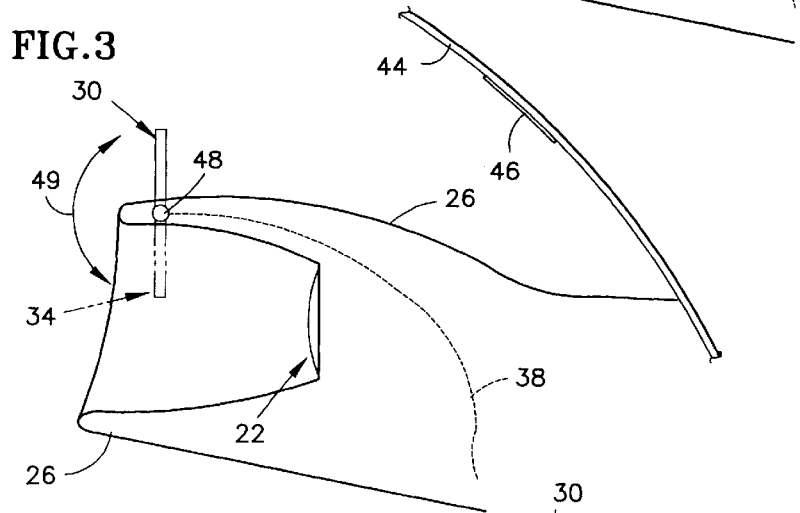
FIG. 3 is a side view of a second embodiment of this invention.

A display screen 30 preferably is supported on the instrument panel frame 26 so that it is moveable between a first position 32 and a second position 34 (shown in phantom). As can be seen in FIGS. 1 through 3, the first position 32 includes the display screen 30 being positioned above the instrument panel 22 and above the dashboard 26. In this first position, the display screen 30 is within the normal line of sight or view of a driver of the vehicle.

The display screen 30 preferably is transparent and electroluminescent so that it does not obstruct the ability for the driver to observe the road while driving. Importantly, the display screen 30 does not include a frame or rim around its perimeter because such a frame or rim may obstruct the view of the driver or distract the driver while the display screen 30 is in the first position 32.

Referring to FIG. 2, a first embodiment of the display system 20 is illustrated in slightly more detail in a diagrammatic fashion. The display screen 30 is moveable between the first position 32 and the second position 34 as illustrated by the arrow 35. A support member 36, which preferably is a sliding channel, supports the display screen in a manner that allows it to be manually moved between the first and second positions 32 and 34. The preferred embodiment includes a cover 37 that is moveable into a position where it closes a gap at the top of the instrument panel frame 26 whenever the display screen 30 is moved into the second position 34. A power and data supply chord 38 preferably is relatively flexible and extendable through the instrument panel frame 26 so that it accommodates the movement of the display screen 30 between the two positions.

The preferred embodiment also includes a filter 40 and a filter 42 that are positioned behind the display screen 30 (relative to the driver). The filter 40 enhances the viewability of any display or image on the display screen 30 by filtering out some light such as sunlight or the light from oncoming headlights that comes through the windshield 44 of the vehicle. Similarly, the filter 42 filters out light coming from the instrument panel 22, which makes the display more effective when the display screen 30 is the a second position 34. A single filter can be used that moves with the screen 30. Alternatively, a filter designed according to the teachings of the pending United States patent application having Ser. No. 08/826,928, which is commonly owned with this application, can be used. Futher, a polarizer 46 preferably is mounted on the windshield 44 to provide additional filtering of light to make the images on the display screen 30 more readily visible.

FIG. 3 shows another embodiment where the display screen 30 is pivotably supported on the dashboard or instrument panel frame 26 by a pivoting support member 48. In this embodiment, the display screen 30 can be flipped from the first position 32 to the second position 34 as generally shown by the arrow 49. Although not specifically illustrated, this embodiment preferably includes a position detector that determines the screen position so that the data supplied will result in a display that is oriented consistent with the screen position. In other words, the display image will need to be flipped whenever the screen is flipped so that the display is not upside down. Importantly, the display screen 30 does not obstruct the view of the driver through the windshield 44 or the view of the instrument panel 22 under normal operating conditions because the display screen 30 preferably is transparent and does not have a frame or rim around the edges that extend outward and away from the instrument panel frame 26.

Figure 4:
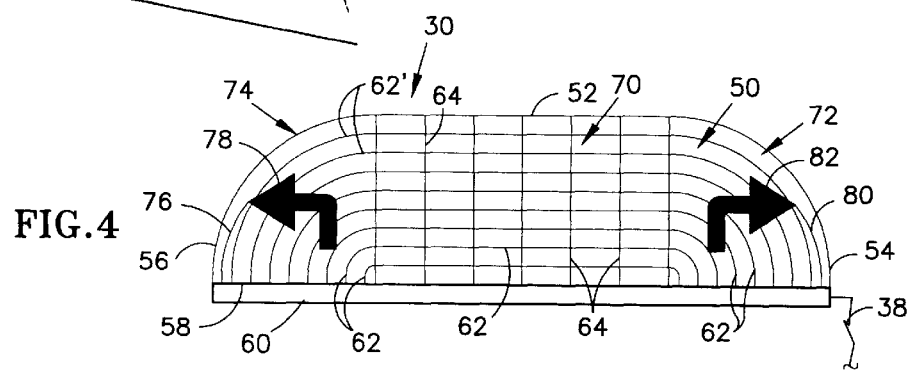
FIG. 4 is a schematic diagram of a display screen designed according to this invention.

FIG. 4 schematically illustrates the preferred embodiment of the display screen in more detail. The display screen 30 preferably includes a transparent display panel 50 having a top edge 52 and side edges 54 and 56. Only the bottom edge 58 includes a frame or rim portion 60. The edges 52, 54 and 56 do not have a frame or rim extending around them, which enhances the ability for the driver to maintain a normal line of sight through the windshield 44 without unnecessary obstruction. All of the power and data for the display panel 50 is supplied through the power supply line 38 (which is connected to a power source that is not illustrated). The electrical connection 38 is maintained through the single rim member 60.

A plurality of row electrodes extend from one side of the rim member 60 and then across a central portion of the display panel 50 and then terminate back at the rim member 60. A plurality of column electrodes 64 extend generally perpendicularly away from the edge 58 of the display screen 50. All of the power and data is supplied for the entire display screen from the one side of the display. The row electrodes 62 and column electrodes 64 interact within the central portion 70 of the display 50 to provide a first, reconfigurable display portion. The row electrodes 62 and column electrodes 64 operate in a conventional manner to illuminate selected pixels within the first portion 70 to provide display images as desired.

The display screen 50 also includes non-reconfigurable portions 72 and 74. These portions have the row electrodes 62 extending through them. The row electrodes 62 preferably extend through the portions 72 and 74 in a generally arcuate pattern as illustrated. The preferred embodiment preferably includes at least some of the row electrodes 62 having a varying thickness along a portion of their length. Since the length of each of the traces that constitute the row electrodes 62 is proportional to the resistance associated with each row electrodes, the preferred embodiment modifies the thickness of some of the row drivers to maintain a more consistent resistance across the entire display panel 50. For example, the row electrodes 62' have a length that is much longer than the row electrodes that extend across the reconfigurable portions 70 closer to the edge 58 of the display 50. The portions of the row electrodes 62' that extend through the screen portions 72 and 74 preferably have a greater thickness than the portions of the same row electrodes extending through the reconfigurable portion 70. Further, the thickness of the row electrodes 62' within the portions 72 and 74 are greater than the thicknesses of the row electrodes that extend along the portions 72 and 74 but have a relatively shorter length. The thicker portions of the longer row drivers reduces the resistance associated with those row electrodes and maintains a more consistent resistance across the entire display panel. The thickness can be increased in one or more directions (i.e., parallel with the screen or perpendicular to the screen).

The most preferred embodiment includes an icon electrodes 76 that extends out of the frame member 60 for selectively illuminating an icon 78 within the portion 74. The is formed by shaping the electrode 76 and icon 78 can be, for example, a turn signal indicator. Similarly, the portion 72 of the screen 50 preferably includes an icon electrode 80 for selectively illuminating an icon 82. Since the portions of the screen 72 and 74 are not reconfigurable, one or more icons can conveniently be provided on those portions to provide additional information to the driver through the display 30. The information to be supplied on the reconfigurable portion 70 and the form of the icons 78 and 82 can vary depending upon the needs of a particular embodiment.

A significant advantage is provided by the inventive arrangement because the display screen 50 has a frame or rim member 60 along only one edge 58 of the display 30. Therefore, a transparent display screen 50 can be placed above the instrument panel without obstructing a driver's normal view of the road. This arrangement allows for additional information to be provided to a driver in an effective and convenient manner within the already limited space within the interior of a vehicle.

The preceding description is exemplary rather than limiting in nature. Variations and modifications may become apparent to those skilled in the art that do not depart from the purview and spirit of this invention. The legal scope of protection given to this invention is to be limited only by the following claims.

We claim:

1. A display system, comprising:
   a panel having a first reconfigurable portion and a second portion;
   a panel rim extending along only one side of said panel;
   a plurality of row electrodes supported by said panel rim and extending from said rim into said second panel portion at an angle relative to said one panel side and along said panel first portion in a direction generally parallel to said one panel side; and
   a plurality of column electrodes supported by said panel rim and extending from said rim into said first panel portion in a direction that is generally perpendicular to said one panel side such that said column electrodes interact with said row electrodes extending through said first panel portion.

2. The system of claim 1, wherein said panel is transparent.

3. The system of claim 1, wherein said row electrodes comprise conductive traces supported on said panel and wherein a selected number of said traces have a first thickness where said traces extend through said second panel portion and a second thickness where said traces extend through said first panel portion and wherein said first thickness is greater than said second thickness.

4. The system of claim 1, wherein said row electrodes extend along said second panel portion along a generally arcuate path and extend along said first panel portion in a generally straight line.

5. The system of claim 1, wherein there are two of said second panel portions and said first panel portion is positioned between said second portions.

6. The system of claim 5, wherein said second panel portions are non-reconfigurable display panel portions each including an icon that is selectively illuminated.

7. A display system for use in a vehicle, comprising:

an instrument panel frame within the vehicle;

a support member movably supported by said instrument panel frame for movement relative to said instrument panel;

a display panel having a plurality of pixels and one edge supported by said support member, said display panel being movable into a first viewing position where said display panel is above said instrument panel and a second position;

a plurality of row electrodes extending from said support member and along said display panel; and a plurality of column electrodes extending from said support member and along at least a portion of said display panel such that said row electrodes and said column electrodes cooperate to illuminate selected pixels on said display panel.

8. The system of claim 7, wherein said display panel is transparent.

9. The system of claim 7, wherein said display panel has a first reconfigurable portion and a second portion and wherein said column electrodes extend along said first panel portion.

10. The system of claim 9, wherein said column electrodes each extend from said support member in a direction generally perpendicular to said one panel edge and along said first panel portion in a generally straight line.

11. The system of claim 10, wherein said row electrodes each extend along said first panel portion in a generally straight line in a direction that is generally perpendicular to said direction of said column drivers.

12. The system of claim 9, wherein there are two of said second panel portions positioned on opposite sides of said first panel portion and wherein said row electrodes extend from said support member and along one of said second portions in a generally arcuate direction then along said first panel portion and then along the other second panel portion in a generally arcuate direction and toward said support member such that said row drivers each have a first end and an second end supported by said support member.

13. The system of claim 7, further comprising a filter positioned generally in line with said display panel when said display panel is in said first viewing position.

14. The system of claim 13, wherein said filter comprises a polarizer that is supported on a windshield of the vehicle.

15. The system of claim 7, further comprising a cover member supported on said display panel frame, said cover member being moveable between a closed position when said display panel is in said second position and an open position when said display panel is in said first viewing position.

* * * * *